Patented Nov. 13, 1951

2,575,036

UNITED STATES PATENT OFFICE 2,575,036

PROCESS FOR PREPARING CYANO ARYLAMIDES

De Walt S. Young, Kingsport, Tenn., assignor to Eastman Kodak Company, Rochester, N. Y., a corporation of New Jersey No Drawing. Application May 24, 1950, Serial No. 164,031

4 Claims. (Cl. 260—465)

This invention relates to an improved process for the preparation of cyano-arylamides of the benzene series.

T. Sandmeyer, in Ber. d. Deutsche Chem. Ges., vol. 17, pages 2650–3 (1884); ibid., vol. 18, pages 1492 and 1496 (1885), described a method for the replacement of the aromatic amino group by the nitrile radical comprising the formation of a solution of potassium cuprocyanide by the addition of copper sulfate to potassium cyanide and addition of an acid solution of a diazonium salt to the resulting mixture. A yield of 63% of theoretical of benzonitrile was obtained by the above process from aniline. Since that time various modified Sandmeyer procedures have been proposed. For example, H. T. Clarke et al., in Organic Syntheses, vol. 4, page 69 (1925) describe the preparation of p-tolunitrile from p-toluidine. The catalyst in this case was prepared by adding an aqueous solution of sodium acid sulfite and sodium hydroxide to an aqueous solution of copper sulfate and sodium chloride; the insoluble cuprous chloride which formed being then dissolved in sodium cyanide. The diazo salt was added to the catalyst solution. A yield of 64 to 70% of theoretical of p-tolunitrile was obtained. B. M. Bogoslavskii, in J. Gen. Chem. (U. S. S. R), vol. 8, pages 1784–5 (1938); C. A., vol. 33, page 4973 (1939), proposed application of a modified procedure for the preparation of p-cyanoacetanilide by diazotizing N-acetyl-p-phenylene diamine and heating the resulting diazo solution at 90° C. in the presence of potassium cyanide and copper sulfate. A yield of 68.8% of theory of p-cyanoacetanilide was obtained.

I have now found that cyano-arylamides of the benzene series having the general formula:

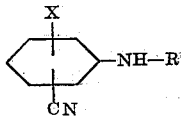

wherein X represents an atom of hydrogen or a methyl group and R represents an acyl group of a saturated aliphatic carboxylic acid containing from 1 to 4 carbon atoms, can be prepared in yields exceeding 90% of theory by an improved procedure which comprises the critical step of adding equivalent molecular portions of the diazonium salt of an N-acyl arylene diamine and the cyanide compound to be reacted therewith, simultaneously to an agitated and heated solution of a catalyst consisting of a cuprous cyanide-sodium cyanide complex to obtain the corresponding nitrile derivative. The free base can be obtained, if desired, by the usual acid hydrolysis procedure for converting carboxylic acid arylamides to free amines. Tar formation produced by prior art processes is entirely absent or greatly minimized in the process of my invention. The new improved process is particularly efficacious for the preparation of p-cyanoacetanilide. Such compounds containing both a nitrile and an amide group are valuable intermediates for the preparation of various other useful compounds.

It is, accordingly, an object of the invention to provide an improved process for the preparation of cyano-arylamides of the benzene series. Another object is to provide an improved process for the preparation of p-cyanoacetanilide. Other objects will become apparent hereinafter.

In accordance with the invention, an N-acyl arylene diamine having the general formula:

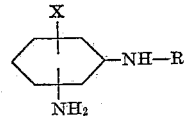

wherein X and R have the previous defined meanings, such as, for example, N-formyl-p-phenylene diamine, N-formyl-o-phenylene diamine, N-formyl-m-phenylene diamine, N-acetyl-p-phenylene diamine, N-acetyl-o-phenylene diamine, N-acetyl-m-phenylene diamine, 2-amino-4-formamino toluol, 4-amino-2-acetamino toluol, 2-amino-4-acetamino toluol, 5-amino-2-acetamino toluol, 2-amino-5-acetamino toluol, 3-amino-4-butyrylamino toluol, etc., is diazotized and the diazo solution is then adjusted to a temperature of from −15° to 80° C., preferably to a temperature of from 10° to 15° C., and added simultaneously with an aqueous alkali metal cyanide solution (e. g., sodium or potassium cyanide) adjusted to a temperature of from −15° to 100° C., preferably at room temperatures, at molecularly equivalent rates of the diazo compound and of the alkali metal cyanide, to the agitated catalyst solution maintained at a temperature of from 0° to 100° C., preferably at from 80° to 85° C. The catalyst solution is a cuprous cyanide-alkali metal cyanide complex, wherein the cuprous cyanide and the alkali metal cyanide are present in the ratio of one mol weight of the cuprous cyanide to from 1 to 3 mol weights of the alkali metal cyanide. The concentration of the reactants in the several aqueous solutions can vary quite widely; for example, the diazo solution is operable at concentrations of from 5 to 15%, but preferably about 10% concentration of the diazo compound, the alkali metal cyanide solution which is added simultaneously with the diazo solution to the catalyst is generally employed at somewhat lower concentrations of from 3% to 10%, but preferably at 5% or 6%, whereas the catalyst solution is generally employed at somewhat higher concentrations of from 10% to 15% of the cuprous cyanide-sodium cyanide complex salt. Through this procedure of simultaneous addition of the diazo solution and the sodium cyanide solution at molecularly equivalent rates to the catalyst solution, the reaction takes place without changing the composition of the catalyst and results in a surprisingly smooth, tar-free reaction which gives high yields of the nitrile product.

The following examples will serve to illustrate further my new process for preparing cyano-arylamides of the benzene series.

*Example.—Preparation of p-cyanoacetanilide*

(a) *Diazotization of N-acetyl-p-phenylene diamine (p-aminoacetanilide)*.—150 g. (1.0 mol) of p-aminoacetanilide were slurried with 2 liters of water and 121 g. of 96% (1.19 mol) sulfuric acid. The mixture thickened as the sulfate formed. Cooling was applied to maintain the temperature at from 10° to 15° C. and 70.6 g. (1.02 mol) of sodium nitrite in 404 cc. of water was added gradually over a period of one hour. The reaction mixture was stirred for an additional hour at from 10° to 15° C. Finally, the solution was neutralized to Congo red paper with 131 g. (0.19 mol) of 15% aqueous sodium carbonate. There was thus obtained an aqueous solution of p-acetaminobenzene diazonium sulfate.

(b) *Preparation of catalyst solution*.—125 g. (0.50 mol) of copper sulfate hydrate were dissolved in 520 cc. of water and 30.4 g. (0.52 mol) of sodium chloride added with stirring to prepare solution A. A second solution designated as B was prepared by dissolving 25 g. (0.24 mol) of sodium bisulfite in 256 cc. of water and to this there were added with stirring 19.2 g. (0.48 mol) of sodium hydroxide. Next, solution A was heated to 85° C. and solution B added to A in 5 minutes at 80°–85° C., and the mixture then cooled to room temperature. The cuprous chloride which formed as a precipitate was allowed to settle and the supernatant liquid was decanted. The residue containing the precipitate was diluted with water to the original volume and 50 g. (1.02 mol) of sodium cyanide was introduced with stirring, the precipitated cuprous chloride going into solution on warming the mixture.

(c) *Conversion of the p-acetaminobenzene to p-cyanoacetanilide*.—A sodium cyanide solution was prepared by dissolving 49 g. (1.0 mol) of sodium cyanide in 800 cc. of water. The catalyst solution prepared as above described was placed into a reaction vessel equipped with a stirrer and heated to a temperature of from 80° to 85° C., and while continuing to stir, the cyanide solution at room temperature and the diazo solution prepared as above described, and at a temperature of from 10° to 15° C., were added simultaneously over a period of 75 minutes at such rates to the catalyst solution that molecularly equivalent amounts of the sodium cyanide and the diazo compound were always contacting the reaction mixture. After the reaction was complete, the mixture was stirred an additional 30 minutes at 85° C. The p-cyanoacetanilide precipitated from the reaction mixture as it formed. Finally, the product slurry obtained was cooled, filtered, and water washed. A yield of 149.6 g. of p-cyanoacetanilide having a melting point of 199°–200° C. was obtained which was equivalent to 93.5% of theory. The p-cyanoacetanilide can then be hydrolyzed to p-cyanoaniline by treating with a strong aqueous mineral acid, for example, with from 5%–10% hydrochloric acid or with 20% sulfuric acid. The conversion of p-cyanoacetanilide to p-cyanoaniline is substantially quantitative in the case of the sulfuric acid hydrolysis.

In place of the p-acetaminobenzene diazonium sulfate in the above example, there can be substituted a molecularly equivalent amount of o-acetaminobenzene diazonium sulfate to give o-cyanoacetanilide or m-acetaminobenzene diazonium sulfate to give m-cyanoacetanilide, 2-acetaminotolyl-4-diazonium sulfate to give 4-cyano-2-acetamino toluol or 4-acetaminotolyl-2-diazonium sulfate to give 2-cyano-4-acetamino toluol or 2-acetaminotolyl-5-diazonium sulfate to give 5-cyano-2-acetamino toluol in similarly high yields.

Other N-acyl arylene diamines such as defined previously can also be diazotized and the diazo salt then converted to the corresponding nitriles by proceeding as described in the above example. Thus, N-formyl-p-phenylene diamine gives p-cyanoformanilide, N-formyl-o-phenylene diamine gives o-cyanoformanilide, N-formyl-m-phenylene diamine gives m-cyanoformanilide, 2-amino-4-formamino toluol gives 2-cyano-4-formamino toluol, 2-amino-5-acetamino toluol gives 2-cyano-5-acetamino toluol, 3-amino-4-butyrylamino toluol gives 3-cyano-4-butyrylamino toluol, etc. All of the mentioned cyanoacylanilides and cyanoacyltoluidides can be converted, if desired, by acid hydrolysis to the corresponding free bases.

What I claim is:

1. A process for preparing p-cyanoacetanilide comprising adding an aqueous solution of p-acetaminobenzene diazonium sulfate adjusted to a temperature of from 10° to 15° C., simultaneously with an aqueous solution of sodium cyanide adjusted to room temperature, at molecularly equivalent rates of the diazonium sulfate and the sodium cyanide, to an agitated solution of a catalyst maintained at a temperature of from 80° to 85° C. and comprising a complex salt of equal molar weights of cuprous cyanide and sodium cyanide, continuing the reaction to completion, and then separating the p-cyanoacetanilide which forms.

2. A process for preparing o-cyanoacetanilide comprising adding an aqueous solution of o-acetaminobenzene diazonium sulfate adjusted to a temperature of from 10° to 15° C., simultaneously with an aqueous solution of sodium cyanide adjusted to room temperature, at molecularly equivalent rates of the diazonium sulfate and the sodium cyanide, to an agitated solution of a catalyst maintained at a temperature of from 80° to 85° C. and comprising a complex salt of equal molar weights of cuprous cyanide and sodium cyanide, continuing the reaction to completion, and then separating the o-cyanoacetanilide which forms.

3. A process for preparing m-cyanoacetanilide comprising adding an aqueous solution of m-acetaminobenzene diazonium sulfate adjusted to a temperature of from 10° to 15° C., simultaneously with an aqueous solution of sodium cyanide adjusted to room temperature, at molecularly equivalent rates of the diazonium sulfate and the sodium cyanide, to an agitated solution of a catalyst maintained at a temperature of from 80° to 85° C. and comprising a complex salt of equal molar weights of cuprous cyanide and sodium cyanide, continuing the reaction to completion, and then separating the m-cyanoacetanilide which forms.

4. A process for preparing a cyanoacetanilide comprising adding an aqueous solution of an acetaminobenzene diazonium sulfate adjusted to a temperature of from 10° to 15° C., simultaneously with an aqueous solution of sodium cyanide adjusted to room temperature, at molecularly equivalent rates of the diazonium sulfate and the sodium cyanide, to an agitated solution of a catalyst maintained at a temperature of from 80° to 85° C. and comprising a complex salt of cuprous chloride and an alkali metal cyanide wherein the cuprous cyanide and the alkali metal cyanide are present in the ratio of one mole weight of the cuprous cyanide to from 1 to 3 mole weights of the alkali metal cyanide, continuing the reaction to completion, and then separating the cyanoacetanilide which forms.

DE WALT S. YOUNG.

REFERENCES CITED

The following references are of record in the file of this patent:

UNITED STATES PATENTS

| Number | Name | Date |
|---|---|---|
| 1,922,207 | Jones et al. | Aug. 15, 1933 |
| 1,962,559 | Hagenest et al. | June 12, 1934 |
| 2,044,015 | Perkins et al. | June 16, 1936 |
| 2,068,321 | Gubelmann et al. | Jan. 19, 1937 |

OTHER REFERENCES

Ashley et al., J. Chem. Soc. (London) vol. 1942, p 103.

Bogoslovskii, Chem. Abstracts, vol. 33, p. 4973 (1939).

Barber, J. Chem. Soc., vol. 1943, p. 79.

Weygand, "Organic Preparations," p. 115, Interscience Publications (1945).

Mowry, Chem. Reviews, vol. 42, pp. 213-215 (1948).

Vogt, P. B. Report No. 712, Office of Technical Services, U. S. Dept. of Commerce (1946).